Oct. 10, 1961     A. MAGG     3,003,607
SYNCHRONIZATION DEVICE, PARTICULARLY FOR
MOTOR VEHICLE GEAR SHIFT TRANSMISSIONS
Filed Jan. 28, 1959     3 Sheets-Sheet 1

*Inventor:*
ALFRED MAGG

Oct. 10, 1961  A. MAGG  3,003,607
SYNCHRONIZATION DEVICE, PARTICULARLY FOR
MOTOR VEHICLE GEAR SHIFT TRANSMISSIONS
Filed Jan. 28, 1959  3 Sheets-Sheet 2

Inventor:
ALFRED MAGG

Inventor:
ALFRED MAGG 3,003,607
SYNCHRONIZATION DEVICE, PARTICULARLY FOR MOTOR VEHICLE GEAR SHIFT TRANSMISSIONS
Alfred Magg, Friedrichshafen, Germany, assignor to Zahnradfabrik Friedrichshafen, Aktiengesellschaft, Friedrichshafen am Bodensee, Germany
Filed Jan. 28, 1959, Ser. No. 789,635
Claims priority, application Germany Feb. 11, 1958
4 Claims. (Cl. 192—53)

This invention relates to synchronization devices, for example of the type shown in the co-pending applications of Zittrell et al., S.N. 406,797, filed January 28, 1954, now Patent No. 2,900,059, granted August 18, 1959, for a "Synchronizing Device"; and Zittrell et al., S.N. 647,889, filed March 22, 1957, now Patent No. 2,931,474, granted April 5, 1960, for "Engageable Tooth Clutch, Especially for Change Gear Transmissions," assigned to the assignee of the present application.

The instant invention constitutes an improvement over the mechanisms shown in the co-pending applications and teaches the manner in which a shiftable synchronizing sleeve can be used in conjunction with large gear shafts and still remain part of a relatively small and compact clutching and de-clutching mechanism selectively engagable with gears of a transmission.

A particular object of the invention is to provide a synchronizing mechanism useable with a large-size driving shaft without, however, the need for materially increasing the size of the synchronizing elements.

Othere objects and features will be apparent from the description to follow.

Briefly, the purpose of the invention is accomplished by providing locking pins which co-act directly with cam surfaced recesses provided in the driving shaft itself, rather than co-acting with cams or cam depressions provided on collars or sleeves which are in turn carried on the shaft. Such construction makes it possible to reduce the outer diameter of the synchronizing mechanism and to improve ease of radial sliding of the locking elements by increasing the guided length of same, while at the same time being considerably smaller in the axial direction of the clutch.

A detailed description of the invention will now be given in conjunction with the appended drawing in which.

Figure 1:
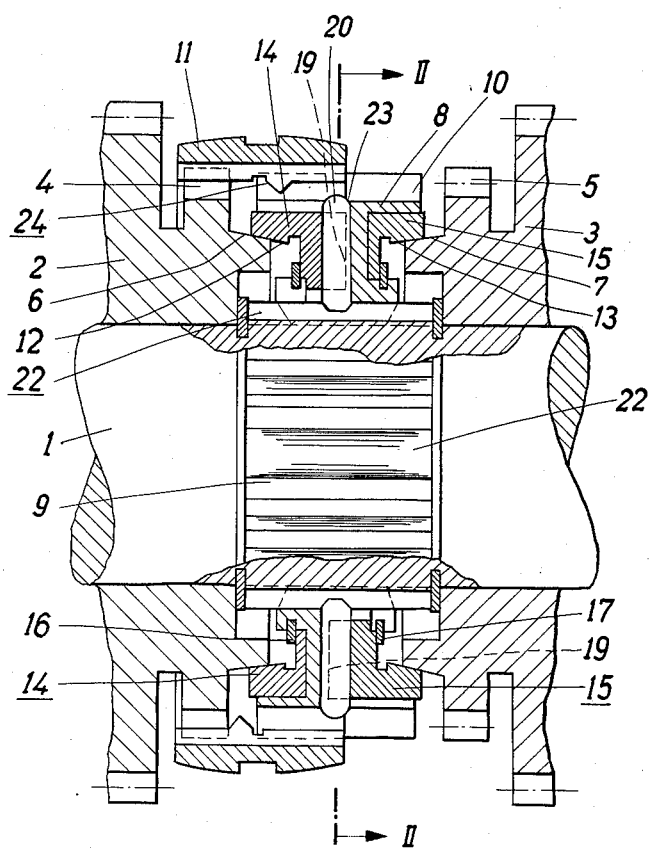
FIG. 1 is a section on the line I—I of FIG. 2 showing the synchronizing mechanism in position such that a gear is engaged with the drive shaft.

Referring now to the drawing, a driving shaft 1 is disclosed which carries the gears 2 and 3, which gears are freely rotative on the shaft but suitably restrained against the longitudinal movement thereon by any suitable means such as washers, etc. (not shown). The gears are provided with respective toothed clutching rings 4 and 5 and conically shaped frictional clutch surfaces 6 and 7. A synchronizing collar 8 is provided which is longitudinally slidable toward either of the gears 2 or 3, the element 8 being in the form of a ring slidably splined as by the ribs 9 of shaft 1 and carried on the shaft. Further, the synchronizing element 8 is provided on its periphery with teeth 10 slidably engageable with the teeth provided internally of a shifting sleeve 11. It will be understood that the sleeve 11 is provided with an external groove for coupling a manually movable yoke for effecting shifting of sleeve 11 to the left or right, depending upon whether gear 2 or 3 is to be engaged. Thus, as viewed on FIG. 1, the teeth of sleeve 11 are engaged with the positive driving clutch teeth 4 of gear 2. Similarly, the teeth of sleeve 11 might be engaged with the positive drive clutch teeth 5 of gear 3 were sleeve 11 to be pushed to the right.

The synchronizing collar 8 carries a pair of synchronizing rings 14 and 15 which are furnished with conic friction surfaces 12 and 13. The rings 14 and 15 are secured to collar 8 by snap rings 16 and 17 with a rotative fit so that a certain amount of rotation can be effected between either ring 14 and 15 and the collar 8. Thus, it will be apparent that either of the synchronizing rings can engage via the conic surfaces with either of the respective gears, in a manner heretofore known in devices of this type.

Collar 8 is provided with a pair of diametrically opposed recesses 18 in each face thereof.

Each of the rings 14 and 15 is provided with two pairs of foreshortened cheeks 19 which are diametrically opposed and which protrude into (FIG. 2) the open ended recesses 18 provided in the respective sides of the collar 8. Locking pins 20 are retained between respective pairs of cheeks and bear against the opposing walls of collar 8 for support, as shown in FIG. 1. Thus, the upper pin 20 is retained between cheeks 19, shown dotted, and bears against collar 8, in the bottoms of respective recesses 18. In that manner all pins 20 are retained on respective sides of collar 8 and rest axially on shaft 1.

Figure 2:
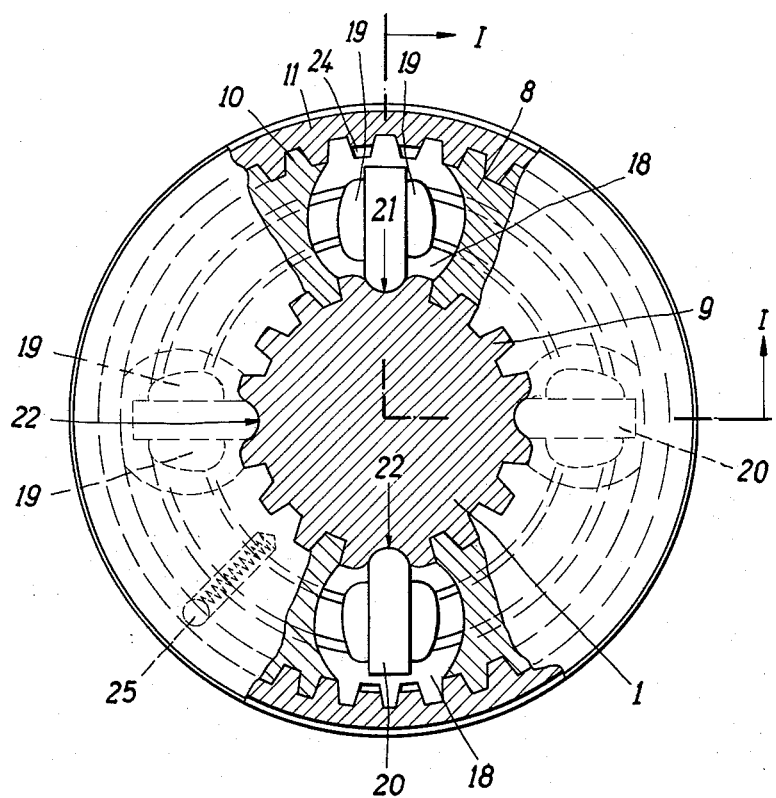
FIG. 2 is a partial cross-section taken at right angles to FIG. 1.

Referring to FIG. 2, it will be noted that the cylindrically rounded inner extremities of the pins 20 engage in similarly shaped recesses machined into shaft 1. Pins 20 are of rectangular cross-section in a plane normal to their length, as will be seen by comparing FIGS. 3 and 4. Thus, the surfaces of the recesses 22 serve as cam surfaces for effecting outward radial movement of respective pins 20.

The outer ends of the pins 20 are cam shaped as seen on FIG. 1 and co-act with cammed surfaces 24 cut into a pair of adjacent teeth of the shift sleeve 11. Thus, each pin 20 co-acts with cam surfaces such as 24 at its exterior end.

A conventional arrangement of spring pressed ball detent 25 is provided which co-acts with the teeth of the sleeve 11 for holding the sleeve in either of its frictional gear engaging positions.

It will be apparent from comparison of FIGS. 1 and 2 that the recesses and cheeks are so designed that all of the pins 20 are in the same diametral plane. However, it will, of course, be understood that pairs of the inner teeth of sleeve 11 are provided with the cam surfaces 24 in symmetrical right angle relation required for actuation of each of the respective four pins 20, as shown in accordance with the layout of FIG. 2.

From the foregoing description it will be apparent that rotation in unison is had by shaft 1, collar 8, sleeve 11, and rings 14 and 15, together with the cheeks 19 and pins 20 guided and retained by the cheeks.

Figure 3:
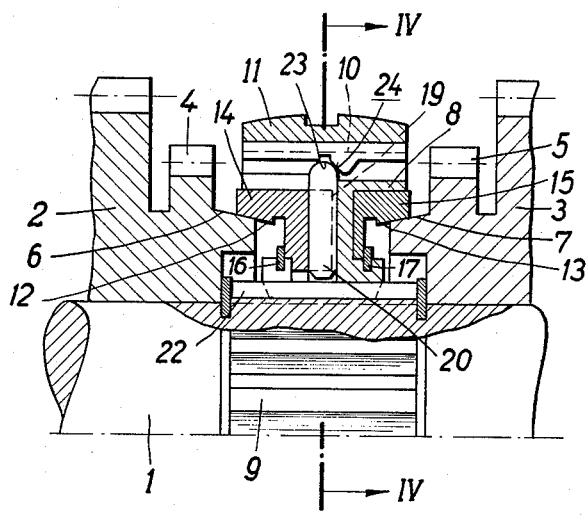
FIG. 3 is a partial section along the line III—III of FIG. 4 showing the synchronizing sleeve locked against motion, prior to synchronization of the sleeve and the gear which it is to engage.
Figure 4:
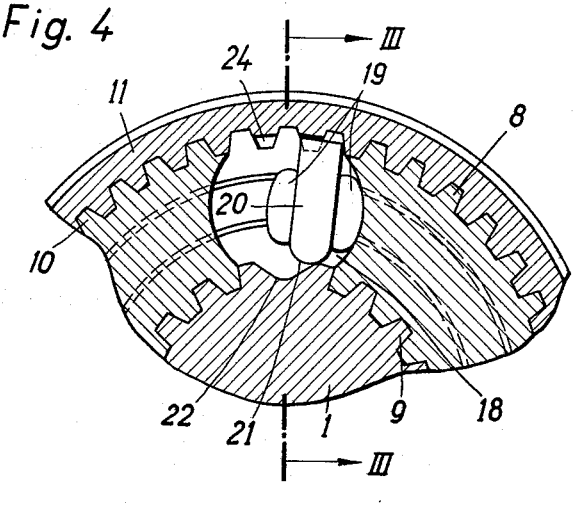
FIG. 4 is a partial cross-section along the line IV—IV of FIG. 3, taken at right angles to FIG. 3.

Viewing FIG. 3, it will be seen that the sleeve 11 is not engaging either clutch teeth sets 4 or 5. If, now, sleeve 11 be pushed, say, to the right, the conic surface 13 will engage the conic surface 7 with enough frictional drag to effect relative rotation between the ring 15 and the synchronizing collar 8. This produces a camming radially outward of pin 20 as seen on FIG. 4, by virtue of the cam surface 22. The outer end of pin 20 thus is forced into the gulley between the cam surfaces 24 and materially blocks relative motion to the right of the sleeve 11 with respect to collar 8. Accordingly, inner annular teeth of sleeve 11 cannot mesh with the teeth 5. However, the gear 3 is quickly brought up to the same speed as the synchronizing ring 15, at which time the pin 20 may be forced radially inwardly by continued manual longitudinal sliding force exerted on collar 11, the cam surface 24 pushing the pin 20 downwardly. The teeth of collar 11 may then engage with the teeth 5.

From the foregoing description it will be seen that by providing the cam surfaces 22 directly in the shaft 1, instead of through an intermediate hub, as has heretofore been the custom, and therefore locating the locking pins close to the driving shaft a more compact synchronizing mechanism of small outer diameter is effected.

Having thus described my invention, I am aware that various changes may be made without departing from the spirit thereof, and accordingly I do not seek to be limited to the precise illustration herein given except as set forth in the appended claims.

I claim:

1. In a gear shift synchronizing mechanism having a drive shaft and a pair of spaced gears thereon, wherein said gears are provided with positive drive clutch teeth, means for coupling said shaft with said gears comprising a collar keyed to said shaft and rotative therewith, said collar carrying a pair of synchronizing rings having frictional surfaces alternately engageable with respective gears for frictional drive thereof, said synchronizing rings having relative rotation with respect to said collar, a shifting sleeve carried by said collar and slidably splined thereto and having teeth selectively engageable with either of the positive drive clutch teeth of said gears, locking pin means carried by said synchronizing rings, said pin means having cam means at both ends and being radially slidable with respect to said synchronizing rings, and cam surfaces provided on said shaft and engageable with cam means at one end of said pin and being oriented to force said pin means radially outward responsive to relative rotation between said shaft and said synchronizing rings, and the teeth of said shift sleeve having cam surfaces coacting with the cam means at the other end of said locking pin means operative to lock said shift sleeve against longitudinal motion, and to cam said locking pin means radially inward upon synchronization being effected between said shift sleeve and either of said gears.

2. In a synchronizing gear shift coupling, a shaft, a synchronizing collar carried by said shaft, a synchronizing ring carried by said collar, a locking pin carried by said synchronizing ring and radially slidable with respect to said shaft, a shift sleeve carried by said collar and longitudinally slidable thereon, a recess having a cammed surface in said shaft oriented to force said locking pin radially outward upon relative rotation between said shaft and said synchronizing ring and a cam element carried by said shift sleeve abuttable with said locking pin for preventing longitudinal sliding of said shift sleeve when said pin is forced radially outwardly by said cammed surface of said shaft, said locking pin extending radially through said synchronizing collar and having a cam follower portion at each end thereof protruding from said synchronizing collar and co-acting at respective ends with said cammed surface in said shaft and said cam element carried by said shift sleeve.

3. In a synchronizing mechanism for a gear transmission, a shaft, a collar carried by said shaft and rotative therewith, a synchronizing ring carried by said collar and having relative rotation with respect thereto, a locking pin carried by said synchronizing ring and being disposed for radial sliding with respect thereto upon relative rotation between said ring and said shaft, a shifting sleeve carried by said collar and being longitudinally slidable with respect thereto, means carried by said shifting sleeve engagable by an outer end of said pin to block shifting of said sleeve, said pin extending itself in a radial direction along the radial thickness of said collar between said shaft and said shifting sleeve and being confined for substantially its full length within said thickness, and said shaft being a cam recess engaged by an end of said pin and being oriented to effect said radial sliding responsive to said relative rotation between said shaft and said ring.

4. In a synchronizing mechanism for a gear shift transmission, a shaft, a collar carried by said shaft and rotative therewith, a synchronizing ring carried on said collar and having relative rotation with respect thereto, a pair of diametrically opposed locking pins carried by said synchronizing ring, a shifting sleeve carried by said collar and longitudinally slidable on said collar, and means whereby said pins are operative to lock said sleeve against longitudinal motion responsive to relative rotation between said collar and said synchronizing ring, including an additional synchronizing ring carried by said collar, said rings being disposed on opposite faces of said collar, a pair of diametrically opposed locking pins carried by said additional synchronizing ring, and recesses in said collar in which all of said pins are disposed, whereby said pins are in a common diametric plane, said recesses extending radially through the inner and outer peripheries of said collar, whereby said pins engage said shaft, said shaft having means to effect reciprocal movement of said pins responsive to relative rotation between said shaft and said synchronizing rings.

References Cited in the file of this patent

UNITED STATES PATENTS

| 1,973,807 | Grinham et al. | Sept. 18, 1934 |
| 2,165,872 | Reggio | July 11, 1939 |
| 2,397,344 | Fishburn | Mar. 26, 1946 |

FOREIGN PATENTS

| 733,745 | Great Britain | July 20, 1955 |